United States Patent Office 3,606,665
Patented Sept. 21, 1971

3,606,665
METHOD OF RESTORING WORN BRAKE SURFACES
Harold Glucoft, 1351 Sunset Ave.,
Santa Monica, Calif. 90405
No Drawing. Filed Sept. 11, 1969, Ser. No. 857,212
Int. Cl. C23c 1/00, 1/10
U.S. Cl. 29—401   10 Claims

ABSTRACT OF THE DISCLOSURE

Worn brake drums or discs are rebuilt by spraying the worn brake-shoe engaging surfaces with a mixture of molten copper and steel to form a layer of a thickness at least that of the material worn away or if more, it is machined to the proper dimension. New brake drums as furnished by the manufacturer may also be provided with a braking surface according to the above method.

---

The problem usually encountered at the time worn brake shoes are being replaced on a vehicle, for example, is that the brake-shoe engaging surfaces of the drums or discs mounted on the vehicle wheels are found to be rough, uneven and grooved. These surfaces must be evened out and smoothed in order to effect proper contact thereof with the new brake-shoes. The usual practice is to turn down these surfaces on a lathe to the required smoothness thus removing a significant amount of the iron or steel of which it is comprised. The thickness of the drum or disc wall is thus so decreased as to increase the possibility of cracking of the drum or disc during u e and endangering the safety of the vehicle. In many cases, if the brake-shoes must be replaced a second or further time, the brake drums or discs would have to be replaced with new ones, since to turn them down on a lathe more than once would so weaken their structure as to make them unfit for further use. When the wall thickness of a brake drum or disc is not within the tolerance specified by the automotive safety code, the drum or disc is considered unsafe for further use on the vehicle for which it was originally intended. Frequent replacement of such equipment during the possible life of the vehicle is uneconomical so that a quick, economical way of restoring the wall thickness, while at the same time also restoring the smoothness of the braking surface is highly desirable.

To this end I have developed a quick, easy and economical method of restoring brake drums to the original diameter of its braking surface and brake discs to their original wall thickness, and at the same time restoring the evenness and smoothness of their braking surfaces any number of times without limit. I do this by metallizing the braking surface; that is I utilize the principle of the electric arc for melting steel and copper and spraying these materials evenly onto the worn braking surfaces to build up the wall thickness. Not only can this method be used for restoring worn braking surfaces to their original like-new condition, but also in providing new brake drums or discs, during their manufacture, with braking surfaces of mixed iron and copper on a body structure of iron or steel.

It is therefore an object of the invention to restore the smoothness of worn braking surfaces without removing or cutting away any of the original material on such surfaces.

It is a further object of the invention to restore the wall thickness of a worn brake disc or drum, and also the braking surface diameter of the latter.

It is still another object of the invention to porvide a metal braking drum or disc with a braking surface comprised of a mixture of copper and steel.

In carrying out the invention, the brake drum or brake disc is mounted in such a way that it can be rotated about its center. One or more spray nozzles, from each of which a spray of molten material issues, may be mounted at a station and directed against the surface of the drum or disc which is contacted by the brake shoe. It is obvious, of course, that the drum or disc may be stationarily supported while the nozzle or nozzles are rotated relative to the axis of the braking surface. The molten metal stream issues from a nozzle in a finely divided state and at a high temperature. As it impinges on the braking surface it cools quickly, adheres tenaciously, becomes an integral part of the wall and does not flake off in use. If the cross-sectional dimensions of the spray are such that within a defined area it covers only a portion of the width of the braking surface, then relative movement of the braking surface and nozzle may be effected so that the molten stream is swept over the width of the surface during the relative rotation of the nozzle and braking surface.

The entire surface thus becomes smooth and even, that is, all the grooves and ruts in the surface are filled with the sprayed metal. The coating of the braking surface is thus continued until the wall reaches at least the desired thickness. In the case of brake discs used with caliper type brake shoes, the opposite braking surfaces may be so coated either simultaneously or they may be coated successively.

The source of molten metal which is used for coating the worn braking surfaces is a metal arc gun comprised of a pair of electrodes connected to opposite terminals of a power source. One electrode comprises copper while the other is of iron. When an arc is struck between the tips of the electrodes, the intense heat of the arc melts the metal electrodes at the arc location. By blowing compressed air or other gas at high velocity through a nozzle and against the electrode tips where the molten metal is being formed, a thin spray of such molten metal is projected from the gun. The exact structure of the arc gun is not material to the practice of this invention, since such guns are well known in the art, as for example the one shown in FIG. 11 of Pat. No. 2,196,647.

As heretofore stated, a mixture of copper and steel is utilized in restoring the braking surface and the wall thickness of a worn drum or disc. As well known, the thermal conductivity of copper is much higher than steel and all of the heat generated by friction of the brake shoes against the braking surfaces of the drum or disc, therefore flows to the cooler portions thereof and is quickly dissipated even during the braking operation. This effective cooling of braking surface, renders the braking operation more effective and increases the life of the brakes over those in which no such heat dissipation is provided for. The amount of copper in the mixture may be as low as thirty percent thereof and still be effective in transferring the heat away from the brake surface to where it is easily dissipated. I have found however, that a mixture of copper and steel in which equal amounts of these metals are utilized, provides the most satisfactory results.

There are several ways of obtaining a mixture of molten materials in which the relative amounts of copper and steel may be varied. One way, in utilizing the arc gun referred to above, is to substitute for one of the electrodes a copper clad steel electrode having a predetermined percentage of copper, depending on the mixture desired. Thus, if 30% of Cu is desired in the mixture, a copper clad steel electrode having 60% of Cu is substituted for the steel electrode. In the same way, if more than 50% Cu is desired in the mixture, a copper clad steel wire having the desired percentages of copper and steel is substituted for the copper electrode.

In the actual practice of the invention, the thinnest portion of the worn brake drum or disc is first measured to determine the amount of metal that must be deposited onto the worn braking surface to restore the wall to the original thickness specified by the manufacturer. Since the amount of molten metal per unit of time, projected from the nozzle of the above referred to spray apparatus is easily determined, the time required for depositing a coating of a desired thickness on a given size of brake drum surface or disc, can easily be calculated so that the operation can be automatically terminated at the proper time. Within such time, the number of full relative revolutions of the drum or disc and the gun and the rate of sweep of the spray over the surface to be coated, can be adjusted, in order to provide an even coating of the metal mixture on the braking surface. If the rate of flow of the effluent from the spray gun can be held constant, the entire operation of restoring the wall of worn vehicle brake drums or discs to their original uniform thickness may be carried out automatically. However, if there is any possibility of variation in the flow of the effluent, the relative rotation or the rate of sweep of the spray, or if the entire operation is carried out by hand, it is considered best to apply the metal mixture coating to a greater depth than required and after cooling, to machine the surface on a lath to bring the brake wall to the proper thickness and the standard vehicle brake drum to the proper diameter. If, as above stated, no less than about 50% of copper is used in the mixture the drum or disc can be turned down on an ordinary brake drum lathe usually found in automobile service shops. If less than that percentage of copper is used in the mixture, the coated layer becomes very hard and almost impossible to machine with the usual brake drum lathe and would require an expensive type of high speed machine shop lathe. On the other hand, more than 50% of copper in the mixture would provide a braking surface which is too soft and which would wear even faster than the original drum or disc of cast iron. Besides, the price of copper at this time being about three times that of steel, the economic feasibility of rebuilding brake drums and discs with a mixture which includes more than 50% of copper as compared to the price of new equipment would be impaired.

Although I have disclosed my method as especially useful in reconditioning a worn braking surface to its original new smooth condition and at the same time restoring the wall of the brake drum or disc to its original thickness, it is clear that the above described method may be used as a step in the manufacture of new brake drums and discs. That is, the braking drums and discs are manufactured in the conventional manner but with thinner walls than in standard practice. The mixture of copper and steel, together with its attendant advantages, is then applied to the walls of such devices in the manner described above until the desired wall thickness is reached.

There is a definite need for increasing the wearing capability of brake drums and discs at a price which is reasonable as compared to the price of new ones. It is believed that a braking surface provided by a layer comprised of a mixture of equal amounts of copper and steel applied in the manner above described, fulfills this need. Having thus described my invention with the particularity required by the statutes, I claim:

1. The method of coating the wall of a metallic braking element, such as a brake drum or brake disc, with a brake-shoe engaging layer comprising simultaneously depositing onto the same areas of the brake-shoe engaging face of such element molten metals including iron and copper and terminating such deposition when the thickness of the wall reaches a predetermined value.

2. The method of claim 1 in which the amount of copper does not exceed the amount of iron.

3. The method of claim 1 in which equal amounts of copper and iron are deposited.

4. The method of claim 1 in which the molten metals comprise a mixture of said copper and iron.

5. The method of claim 4 in which the amount of copper does not exceed the amount of iron.

6. The method of claim 4 in which the mixture comprises equal amounts of copper and iron.

7. The method of claim 1 in which the step of depositing comprises spraying said metals simultaneously while they are in a molten state.

8. The method of restoring the smoothness of the worn brake-shoe engaging surface of a metallic brake drum or brake disc and simultaneously replacing the wall thickness thereof comprising, spraying said surface with a mixture of molten copper and iron until the wall thickness exceeds a predetermined value, and removing metal from said restored surface after cooling, until the predetermined thickness is reached.

9. The method of claim 8 in which the amount of copper does not exceed the amount of iron in the mixture.

10. The method of claim 8 in which the mixture includes equal amounts of copper and iron.

References Cited
UNITED STATES PATENTS 2,775,323  12/1956  English _____ 188—251M
3,191,734  6/1965  Batchelor et al. ____ 188—251M ALFRED L. LEAVITT, Primary Examiner E. G. WHITBY, Assistant Examiner U.S. Cl. X.R.

29—196.3, 527.2; 117—105.1, 131; 188—251M